United States Patent [19]

Dezvane et al.

[11] 4,286,485
[45] Sep. 1, 1981

[54] TOOL MOUNTING

[76] Inventors: Joseph Dezvane, 28 Virginia Ave., Clifton, N.J. 07012; Vojko Lenac, 19 Putnam Pl., Clifton, N.J. 07011

[21] Appl. No.: 120,076

[22] Filed: Feb. 7, 1980

[51] Int. Cl.³ .............................................. B23B 29/26
[52] U.S. Cl. .................................. 82/36 R; 82/36 A
[58] Field of Search ........................ 82/36 R, 36 A, 37

[56] References Cited

U.S. PATENT DOCUMENTS 2,972,272  2/1961  Sirola ................................... 82/36 A

*Primary Examiner*—Leonidas Vlachos
*Attorney, Agent, or Firm*—Michael J. Striker

[57] ABSTRACT

A tool post has a central bore formed with a normal screw thread. A hub is turnably received in the bore and has a thread cooperating with the thread of the post; it also has one or more steeply pitched helical tracks. One or more undercut grooves are formed in the post, each having a portion open to the bore. Longitudinally diverging wedges are slidably received in these grooves, each having a follower portion projecting into a respective helical track, so that turning of the hub causes the wedges to be shifted axially of the tool post. A sleeve extends from one end through the tool post bore. A slide block has a threaded stud which extends from the other end into the bore of the post and with a tapped blind bore of the sleeve.

4 Claims, 4 Drawing Figures

TOOL MOUNTING

BACKGROUND OF THE INVENTION

The present invention relates to a tool mounting.

More particularly, the invention relates to an improved tool mounting for releasably holding one or more tool holders.

Mountings of this general type are already known in the art, for example from U.S. Pat. No. 2,972,272. This type of equipment is used with lathes and other machine tools on which precision machining operations are carried out. The prior-art devices are not, however, as versatile or otherwise as satisfactory as desirable, so that further improvements are considered necessary.

SUMMARY OF THE INVENTION

Accordingly, it is an object of the invention to provide a tool mounting which offers such improvements over the prior art.

Another object is to provide a mounting of the type in question which permits the precision machining operations to be carried out.

Still a further object is to provide such a mounting having a tool holder the setups of which can be repeatedly carried out without any need to change the relative position of the tool mounted in the holder.

A concomitant object is to provide a mounting of the type in question which is of relatively simple construction, of utmost reliability in operation, and has an extended service life.

In keeping with the above objects and still others which will become apparent hereafter, one aspect of the invention resides in a tool mounting which, briefly stated, may comprise a tool post having a top and a bottom and a bore open at the top and bottom, the post having a slot extending longitudinally of and in angular relation with the longitudinal axis of the bore, the slot opening through a side face of the post and having an inner portion opening into the bore; a slide member arranged in the slot for sliding movement lengthwise of the bore and having an outer wedge-shaped portion provided with a longitudinally extending side face portion, the slide member having an inner part located in the inner portion and provided with a projection which extends into the bore, the post having a longitudinally extending dovetail tongue portion at one side of the slot and with the wedge-shaped portion of the slide member forming a dovetail tongue adapted to receive a tool holder thereon; a tubular hub mounted in the bore for swivel turning movement therein, the hub and the bore having cooperating screw threads, and the hub also having a heclical cam track in which the projection of the slide member is engaged for effecting lengthwise movement of the slide member in the slot and varying the width of the dovetail tongue by turning the hub so as to tighten the tool holder on the dovetail tongue; a handle on the hub for turning the same; a sleeve secured in the bore and about which the hub has swivel turning movement; and means for securing the aforementioned elements of the tool mounting in assembled relation to one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
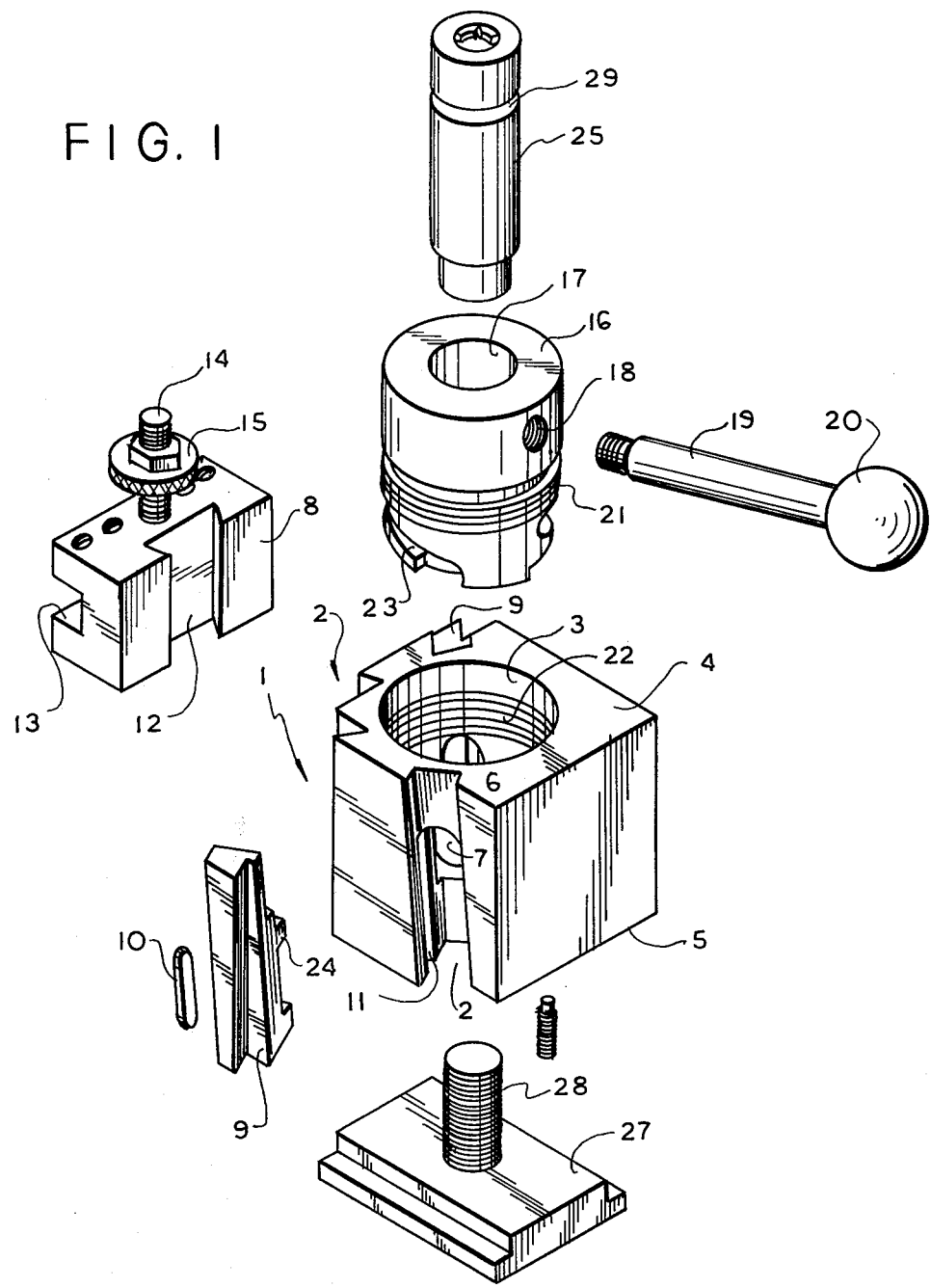
FIG. 1 is a perspective exploded view of a tool mounting embodying the present invention.
Figure 2:
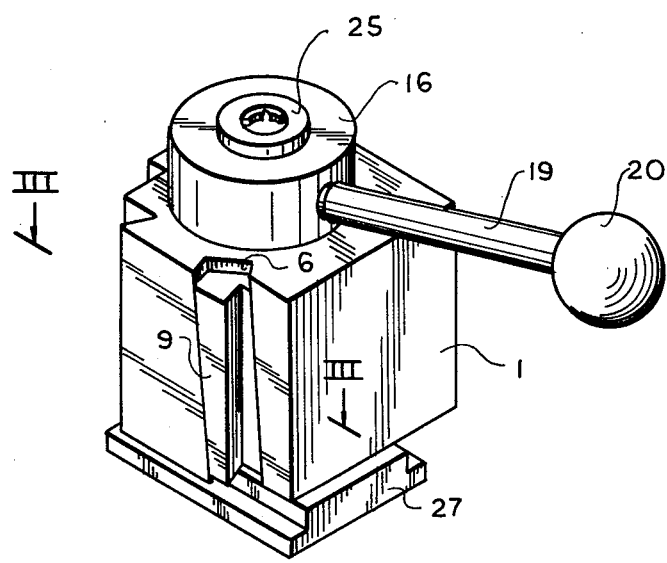
FIG. 2 is a perspective view of the mounting shown in FIG. 1, but illustrating the parts of the mounting in assembled condition.
Figure 3:
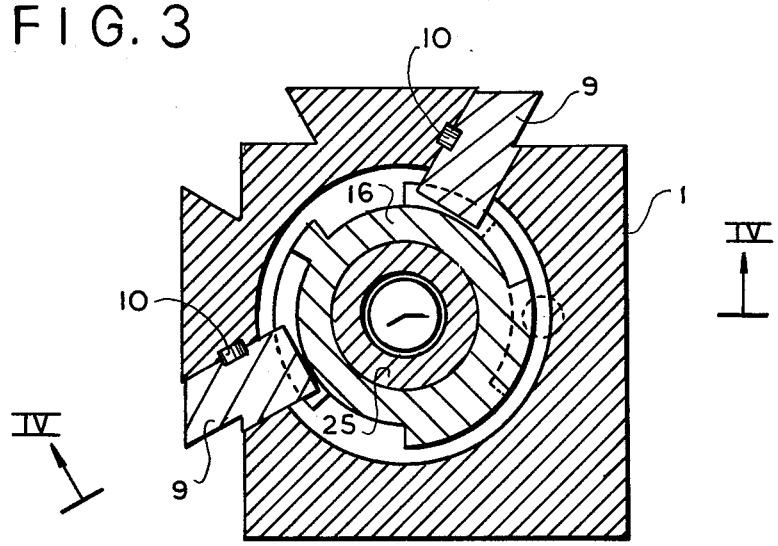
FIG. 3 is a section taken on line III—III of FIG. 2.
Figure 4:
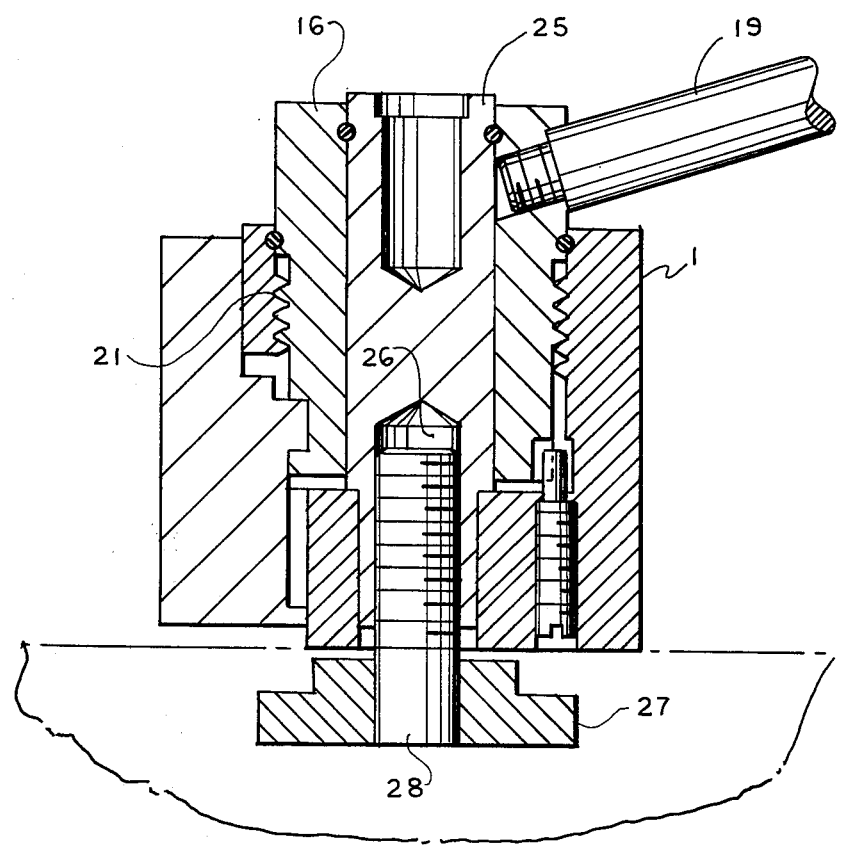
FIG. 4 is a section taken on line IV—IV of FIG. 3.

The drawing illustrates in FIGS. 1-4 an exemplary embodiment of the invention. As shown, the inventive mounting includes a tool post 1 having two (or more) undercut grooves 2 of essentially dovetail-shaped configuration. These extend lengthwise of the center axis of a bore 3 in post 1 and are inclined inwardly towards this axis from the top face 4 in direction to the bottom face 5 of the post. Each groove 2 has a portion 6 which is closed to the bore 3 and another portion 7 which communicates with the bore.

Mounting of the tool holders 8 (one shown) on the post is accomplished by means of wedges 9 (one shown) which are received in the respective grooves 2 so as to be slidable therein. The wedges 9 are retained in the grooves by keys 10 which are received in a lateral recess of the respective wedge section and slide in a keyway 11 of a surface bounding the respective groove. Tool holders 8 have a dovetail-shaped opening 12 in which an outer portion of the wedge 9—i.e., a portion projecting outwardly beyond the groove 2 and the post 1—is receivable. A conventional cut-out 13 is provided in which a portion of a tool shank is receivable, to be clamped in place by set screws 8a. A stud 14 provides vertical adjustment of the tool holder by means of a hex nut and knurled knob 15.

A hub 16 has a central bore 17 and a tapped transverse bore 18 into which the threaded end of a handle 19 can be inserted; the other handle end may carry a ball-shaped knob to facilitate gripping by an operator. The outer circumference of hub 16 is formed with a normal screwthread 21 which meshes with a thread 22 in the bore 3 of post 1, and also with a steep helical cam track 23. When two wedges 9 are present the track 22 will be of two circumferentially offset parts. The inner projection 24 of the respective wedge 9 engages in the helical cam track 23 through groove portion 7 so that the cam track in effect acts as a cam and the portion 24 as a follower. When hub 16 is turned in one direction, cooperation of helical track 23 and projection 24 causes the wedge 9 to be shifted in one axial direction of tool post 1, and turning of the hub in the other direction causes this shifting to be reversed. Thus, when tool holder 8 is in place on the wedge 9, the outer part of the wedge slides in the groove 12 and, since wedge 9 diverges lengthwise in one direction, it becomes wedged in (or released from) the groove 12, depending upon the direction in which the hub 16 is turned.

A cylindrical sleeve 25 has a central tapped blind bore 26 (FIG. 4) and extends fittingly through the bore 17 of hub 16. A slide block 27, serving to secure the tool post to a machine compound or the like, has an upstanding threaded stem 28 which meshes with the tapped bore 26. The circumferential groove 29 (FIGS. 1 and 4) of the sleeve 25 accepts an "O"-ring seal which also has the function of retaining the sleeve in the hub.

The geometry of the inner section of the wedge and its cooperation with the helical cam track, assures an even level engagement of these components at all times, thereby eliminating the thread-mesh jamming which is so common in the prior art.

Moreover, the combined use of both a normal thread and a steeply pitched helical cam track in effect provides the device with a self-locking capability; i.e., when the device has been adjusted to a certain setting it will remain at that setting due to the backlash-free engagement which is provided. This means that e.g., the handle and hub cannot shake and rattle loosely in operation, and that the device is not jarred by vibrations from its selected setting. Evidently, this assures better tool-mounting repeatability as well as sturdy and rigid tool-holder locking in the selected position.

While the invention has been illustrated and described as embodied in a tool mounting for use on machines and machine components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool mounting, comprising a tool post having a top and a bottom and a bore open at said top and bottom, said post having a slot extending longitudinally of and in angular relation with the longitudinal axis of the bore, said slot opening through a side face of said post and having an inner portion opening into said bore; a slide member arranged in said slot for sliding movement lengthwise of said bore and having an outer wedge-shaped portion provided with a longitudinally extending side face portion, said slide member having an inner part located in said inner portion and provided with a projection which extends into said bore, said post having a longitudinally extending dovetail tongue portion at one side of said slot and with said wedge-shaped portion of said slide member forming a dovetail tongue adapted to receive a tool holder thereon; a tubular hub mounted in said bore for swivel turning movement therein, said hub and said bore having cooperating screwthreads, and said hub also having a helical cam track in which said projection of said slide member is engaged for effecting lengthwise movement of the slide member in said slot and varying the width of said dovetail tongue by turning the hub so as to tighten the tool holder on the dovetail tongue; a handle on said hub for turning the same; a sleeve secured in said bore and about which said hub has swivel turning movement; and means for securing the aforementioned elements of the tool mounting in assembled relation to one another.

2. A tool mounting as defined in claim 1, wherein said slot is in part bounded by a side face having a groove extending lengthwise of said slot, said side face portion of said slide member having a projecting part slidably received in said groove.

3. A tool mounting as defined in claim 1; further comprising a stem extending axially in said sleeve concentrically thereto and adapted for mounting the post on a machine, said stem having an end portion engageable with said sleeve.

4. A tool mounting as defined in claim 1, said tool post having said slot and slide member located at one lateral side and said hub having said cam track extending over any part of its circumference; and further comprising an additional slot and slide member similar to the first-mentioned ones but at another side of the tool post, and an additional cam track similar to the first-mentioned cam track but on another part of the hub circumference.

* * * * *